United States Patent
Niegemeier et al.

(10) Patent No.: US 11,312,810 B2
(45) Date of Patent: Apr. 26, 2022

(54) THERMOPLASTIC POLYURETHANE MATRIX RESIN

(71) Applicant: Henkel AG & Co. KGaA, Duesseldorf (DE)

(72) Inventors: Andreas Niegemeier, Duesseldorf (DE); Andreas Ferencz, Duesseldorf (DE); Tamara Schmidt, Oberhausen (DE); Wolfgang Lupp, Duisburg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 262 days.

(21) Appl. No.: 16/429,546

(22) Filed: Jun. 3, 2019

(65) Prior Publication Data

US 2019/0284329 A1    Sep. 19, 2019

Related U.S. Application Data

(63) Continuation of application No. PCT/EP2017/080998, filed on Nov. 30, 2017.

(30) Foreign Application Priority Data

Dec. 7, 2016  (EP) ..................... 16202563

(51) Int. Cl.
| | |
|---|---|
| *C08G 18/32* | (2006.01) |
| *C08G 18/65* | (2006.01) |
| *B29C 45/00* | (2006.01) |
| *B29C 70/48* | (2006.01) |
| *C08G 18/76* | (2006.01) |
| *C08G 18/48* | (2006.01) |
| *C08G 18/66* | (2006.01) |
| *C08K 3/013* | (2018.01) |
| *B29K 75/00* | (2006.01) |
| *C08K 3/04* | (2006.01) |
| *C08K 3/34* | (2006.01) |
| *B29C 70/06* | (2006.01) |

(52) U.S. Cl.
CPC ...... *C08G 18/3209* (2013.01); *B29C 45/0001* (2013.01); *B29C 70/48* (2013.01); *C08G 18/3206* (2013.01); *C08G 18/3215* (2013.01); *C08G 18/4833* (2013.01); *C08G 18/4879* (2013.01); *C08G 18/6511* (2013.01); *C08G 18/6603* (2013.01); *C08G 18/7664* (2013.01); *C08G 18/7671* (2013.01); *B29C 70/06* (2013.01); *B29K 2075/00* (2013.01); *C08K 3/013* (2018.01); *C08K 3/04* (2013.01); *C08K 3/346* (2013.01)

(58) Field of Classification Search
CPC ............ C08G 18/3209; C08G 18/4879; C08G 18/6511; C08G 18/4833; C08G 18/6603; C08G 18/7671; C08G 18/3206; C08G 18/3215; B29K 2075/00; B29C 70/06; B29C 45/0001; B29C 70/48
See application file for complete search history.

(56) References Cited

U.S. PATENT DOCUMENTS

| | | |
|---|---|---|
| 4,387,214 A | 6/1983 | Passmore et al. |
| 9,822,289 B2 | 11/2017 | Roock et al. |
| 9,896,609 B2 | 2/2018 | Roock et al. |
| 2007/0129524 A1 | 6/2007 | Sunkara |
| 2015/0353704 A1 | 12/2015 | Bienmueller et al. |
| 2016/0090515 A1 | 3/2016 | Roock et al. |
| 2016/0145372 A1* | 5/2016 | Doroodian ........... C08G 18/329 521/159 |
| 2017/0233520 A1 | 8/2017 | Poeselt et al. |

FOREIGN PATENT DOCUMENTS

| | | | |
|---|---|---|---|
| CN | 101326212 A | 12/2008 | |
| EP | 2803685 A1 | 11/2014 | |
| EP | 2803686 A1 | 11/2014 | |
| EP | 3315631 A1 | 5/2018 | |
| GB | 1590338 A * | 5/1981 | ............. C08G 18/32 |
| WO | 2015144765 A1 | 10/2015 | |
| WO | 2016050531 A1 | 4/2016 | |
| WO | WO-2016050531 A * | 4/2016 | ............. C08J 5/043 |
| WO | 2016208284 A1 | 12/2016 | |

OTHER PUBLICATIONS

A.R. Bunsell, J. Renard "Fundamentals of Fibre Reinforced Composite Materials", CRC Press 2005, ISBN 0750306890.
International Search Report for International PCT Patent Application No. PCT/EP2017/080998 dated Feb. 15, 2018.
DIN 7708-1:1980-12.
DIN 11357.
DIN EN ISO 527.
DIN EN 2564:1998-08.
DIN EN ISO 1172:1998-12.

* cited by examiner

*Primary Examiner* — Michael L Leonard
(74) *Attorney, Agent, or Firm* — James E. Piotrowski

(57) ABSTRACT

The invention relates to a thermoplastic polyurethane matrix resin composition, comprising at least one $C_{3-8}$ alkane diol, at least one alkoxylated aromatic diol and at least one polyisocyanate. Furthermore, the present invention relates to a fiber-reinforced composite comprising a cured thermoplastic polyurethane polymer matrix according to the present invention and a fiber material. Moreover, a method for the manufacture of the fiber-reinforced composite according to the present invention and use of the composition or the fiber-reinforced composite in railway vehicles, automotive vehicles, aircraft vehicles, boats, space vehicles, motorbikes, bicycles, sporting goods, helmets, functional clothing, shoes, construction parts in bridges and buildings or wind turbine blades are described.

19 Claims, No Drawings

THERMOPLASTIC POLYURETHANE MATRIX RESIN

The invention relates to a thermoplastic polyurethane matrix resin composition, comprising at least one $C_{3-8}$ alkane diol, at least one alkoxylated aromatic diol and at least one polyisocyanate. Furthermore, the present invention relates to a fiber-reinforced composite comprising a cured thermoplastic polyurethane polymer matrix according to the present invention and a fiber material. Moreover, a method for the manufacture of the fiber-reinforced composite according to the present invention and use of the composition or the fiber-reinforced composite in railway vehicles, automotive vehicles, aircraft vehicles, boats, space vehicles, motorbikes, bicycles, sporting goods, helmets, functional clothing, shoes, construction parts in bridges and buildings or wind turbine blades are described.

Fiber-reinforced composites (FRC) contain a fiber material embedded in a cured matrix resin. Since the finished part shall be persistent to high mechanical stresses, the employed matrix forming resin should be firmly connected with the fiber material after curing to avoid defects in the fiber-reinforced composite. Usually, thermosetting matrix resins are employed in the production of fiber-reinforced composites, which usually exhibit extremely high reactivity, leading to an increased generation of heat during curing, which can impair the properties of the fiber material. Moreover, compositions on the basis of thermosetting matrices require due to the curing time a prolonged manufacturing process. Moreover, post-cure modifications of the shape of the resulting composite thermoset materials are possible only by the removal of material, such as cutting or milling. On the other hand, layers of fiber materials treated with thermoplastic matrices typically tend to have insufficient mechanical properties.

There is still need for thermoplastic matrices that allow post cure modifications but can still be used in high speed, high volume processes, such as RTM. It is therefore an object of the present invention to provide an improved thermoplastic polyurethane matrix resin composition which addresses the aforementioned needs, in particular provides a short manufacturing process (high $T_g$, yet formable) and good mechanical properties (high stiffness).

It has been surprisingly found by the present inventors that the thermoplastic polyurethane matrix resin composition described herein provides improved stiffening characteristics and a high glass transition temperature ($T_g$), making it highly suitable for high performance fiber reinforced parts for structural applications, for example produced in RTM processes. Specifically, it has been found that short chain sterically inhibited vicinal diols, such as 1,2-propane diol or 2,3-butane diol, reacted with MDI result in thermoplastic PU resins with high $T_g$ suitable for RTM processing, but which are still moldable/formable. The molecular weight of such resins can be controlled by use of branched polyisocyanates, such as polymeric MDI. The miscibility of the short chain polyol with the polyisocyanate can be improved by use of alkoxylated aromatic diols, such as ethoxylated bisphenol A.

In the present specification, the terms "a" and "an" and "at least one" are the same as the term "one or more" and can be employed interchangeably. In particular, "at least one", as used herein, relates to 1, 2, 3, 4, 5, 6, 7, 8, 9 or more and refers to the different types of the respective compound but not the absolute number of molecules in the composition. "At least one diol" thus means that the composition comprises at least 1 but optionally 2 or more different diols.

The term "essentially free" within the context of this invention is to be interpreted as the respective compound is contained in the composition in an amount of less than 5 wt.-%, 4 wt.-%, 3 wt.-%, 2 wt.-%, 1.5 wt.-%, 1 wt-%, 0.75 wt.-%, 0.5 wt.-%, 0.25 wt.-%, or 0.1 wt.-%, based on the total weight of the composition, wherein the amounts are respectively more preferred in descending order. For example, 4 wt.-% is more preferred than 5 wt.-% and 3 wt.-% is more preferred than 4 wt.-%.

The terms "resin" or "matrix resin" is to be interpreted as "two-component polyurethane matrix resin" unless explicitly stated otherwise.

In the present invention the molar ratio of the isocyanate (NCO) groups of the at least one polyisocyanate (ii) to the sum of the hydroxyl (OH) groups of the at least one diol (i) and the at least one diol (iii) is also referred to as NCO:OH unless explicitly stated otherwise.

In a first aspect, the present invention relates to a thermoplastic polyurethane matrix resin composition, comprising
(i) at least one $C_{3-8}$ alkane diol of formula (I)

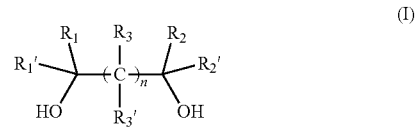

wherein
$R_1$, $R_1'$, $R_2$, $R_2'$, $R_3$ and $R_3'$ are independently selected from H and substituted or unsubstituted $C_{1-4}$ alkyl; and
n is 0, 1, 2 or 3, preferably 0;
wherein, if n=0, 2 or 3, at least one of $R_1$, $R_1'$, $R_2$ and $R_2'$ is substituted or unsubstituted $C_{1-4}$ alkyl;
(ii) at least one polyisocyanate; and
(iii) at least one alkoxylated aromatic diol.

Furthermore, the invention relates to fiber-reinforced composite comprising a cured thermoplastic polyurethane matrix resin composition according to the present invention and a fiber material, characterized in that fiber material is contained in proportions of more than 30% by volume based on the total volume of said fiber-reinforced composite.

Moreover, the invention relates to a method for the manufacture of fiber-reinforced composites according to the present invention, comprising the steps:
1) providing an external mold comprising the fiber material;
2) introducing the thermoplastic polyurethane matrix resin composition according to the present invention into said mold, preferably under pressure; and
3) curing said composition at a temperature of up to 140° C., preferably from 60 to 120° C.

In addition to that, the present invention also relates to the use of the composition according to the present invention or the fiber-reinforced composite according to the present invention in railway vehicles, automotive vehicles, aircraft vehicles, boats, space vehicles, motorbikes, bicycles, sporting goods, exercise equipment, cell phone and laptop housings, helmets, functional clothing, shoes, construction parts in bridges and buildings or wind turbine blades.

Further preferred embodiments of the invention are set out in the claims.

The thermoplastic polyurethane matrix resin composition according to the invention comprises
(i) at least one $C_{3-8}$ alkane diol of formula (I)

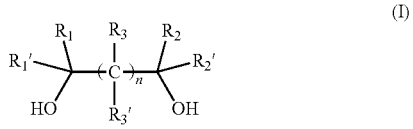

(I)

wherein $R_1$, $R_1'$, $R_2$, $R_2'$, $R_3$ and $R_3'$ are independently selected from H and substituted or unsubstituted $C_{1-4}$ alkyl; and n is 0, 1, 2 or 3, preferably 0;

wherein, if n=0, 2 or 3, at least one of $R_1$, $R_1'$, $R_2$ and $R_2'$ is substituted or unsubstituted $C_{1-4}$ alkyl;

(ii) at least one polyisocyanate; and (iii) at least one alkoxylated aromatic diol.

The at least one sterically restricted diol according to item (i) of the thermoplastic polyurethane matrix resin composition according to the present invention is an alcohol compound that comprises at least two alcohol functions and a stiff hydrocarbon backbone of at least 3 and up to 8 carbon atoms.

In various embodiments, the diol is a vicinal diol, i.e. n=0.

In various preferred embodiments, at least one of the two hydroxyl groups is a secondary or tertiary hydroxyl group, preferably a secondary hydroxyl group. More preferred are embodiments, wherein both hydroxyl groups are secondary or tertiary, preferably secondary hydroxyl groups. This means that in preferred embodiments, $R_1'$ and $R_2'$ are both H.

It is further preferred that the substituted or unsubstituted alkyl groups are selected from methyl, ethyl, n-propyl, i-propyl, n-butyl, 2-butyl and tert-butyl, preferably methyl and ethyl. If substituted, the substituent is preferably a hydroxyl group, thus making the diol a polyol.

In various embodiments, $R_1$ and/or $R_2$ are methyl or ethyl, preferably methyl. Particularly preferred are embodiments wherein n=0 and both $R_1$ and $R_2$ are methyl groups or $R_1$ is H and $R_2$ is methyl.

In preferred embodiments wherein n=0, at least one of $R_1$ and $R_1'$ and at least one of $R_2$ and $R_2'$ is not hydrogen but $C_{1-4}$ alkyl, preferably methyl or ethyl, more preferably methyl. Most preferred are embodiments, wherein $R_1$ and $R_2$ are methyl and $R_1'$ and $R_2'$ are hydrogen, i.e. the compound is 2,3-butane diol.

In other preferred embodiments, n is 1 or 2, preferably 1. In such embodiments $R_3$ and $R_3'$ are preferably H. When n=1, all of $R_1$, $R_1'$, $R_2$, $R_2'$ may be hydrogen. This yields 1,3-propane diol. When n=2 or 3, the hydroxyl groups cannot both be primary hydroxyl groups, i.e. at least one of $R_1$, $R_1'$, $R_2$, $R_2'$ is not hydrogen.

In various embodiments, the diol is selected from the group consisting of 2,3-butane diol, 2,3-pentane diol, 2,3-hexane diol, 3,4-hexane diol, 1,2-propane diol, 1,3-propane diol, 1,2-butane diol, 1,2-pentane diol, 1,2-hexane diol, preferably 2,3-butane diol and 1,2-propane diol, more preferably 2,3-butane diol.

In preferred embodiments, the diols used may be sterically restricted. "Sterically restricted" or "sterically inhibited", as used herein in relation to vicinal diols, means that the molecule parts of the compound of formula (I) are not freely rotatable along the axis of the two carbons atoms bearing the hydroxyl groups.

According to the present invention, the thermoplastic polyurethane (TPU) matrix resin composition contains the at least one diol of formula (I) according to item (i) in an amount of at least 10 wt.-%, based on the total weight of the thermoplastic polyurethane matrix resin composition. In more preferred embodiments the compound according to item (i) is contained in an amount of 10 to 70 wt.-%, preferably 20 to 50 wt.-% relative to the total weight of all polyols in the TPU matrix resin composition.

As suitable monomeric polyisocyanates to be used in the thermoplastic polyurethane matrix resin composition, preferably isocyanates which contain two NCO groups are used. These include well-known aliphatic, cyclo-aliphatic or aromatic monomeric diisocyanates. Polyisocyanates with a molecular weight from 160 g/mol to 500 g/mol are preferred, in particular aromatic polyisocyanates. In various embodiments, aromatic polyisocyanates, such as the isomers of diphenylmethanediisocyanate (MDI), including as 4,4'-diphenylmethanediisocyanate (4,4'-MDI), 2,2'-diphenylmethane diisocyanate (2,2'-MDI), 2,4'-diphenylmethanediisocyanate (2,4'-MDI); the isomers of phenylenediisocyanate, such as 1,3-phenylenediisocyanate, 1,4-phenylenediisocyanate; naphthalene-1,5-diisocyanate (NDI), the isomers of toluenediisocyanate (TDI), such as 2,4-TDI and 2,6-TDI; m- and p-tetramethyl xylylene diisocyanate (TMXDI), m- and p-xylylenediisocyanate (XDI), 3,3'-dimethyldiphenyl-4,4'-diisocyanate (TODD, toluene diisocyanate, naphthalene, di- and tetraalkyl diphenylmethane diisocyanate, 4,4'-dibenzyl diisocyanate, and combinations thereof, are used. Particularly, preferred are 4,4'-diphenylmethanediisocyanate (4,4'-MDI) and 2,4'-diphenylmethanediisocyanate (2,4'-MDI), as well as mixtures thereof.

While not preferred, aliphatic and cyclo-aliphatic isocyanates such as ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-dodecane, 4,4'-dicyclohexylmethanediisocyanate, 1,3-cyclohexane or 1,4-cyclohexane diisocyanate, 1-methyl-2,4-diisocyanatocyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partly hydrogenated), and combinations thereof can also be used.

In preferred embodiments of the invention, the at least one polyisocyanate includes at least one polymeric polyisocyanate. These can be used to control the molecular weight of the resulting TPU resins. Particularly preferred is polymeric MDI, which can be employed either alone or in combination with monomeric MDI (mixtures).

According to various embodiments of the present invention, the at least one polyisocyanate according to item (ii) is selected from the group consisting of 4,4'-diphenylmethanediisocyante, 2,4-diphenylmethanediisocyante, polymeric 4,4'-diphenylmethanediisocyante, polymeric 2,4-diphenylmethanediisocyante, and mixtures of the aforementioned. If polymeric diisocyanates are used, it is preferred that those do not exceed 50 mol % of the total amount of polyisocyanates used. In preferred embodiments, such polymeric diisocyanates are used in combination with monomeric diisocyanates and are used in amounts of up to 50, preferably up to 40, more preferably up to 30 mol % of the total amount of polyisocyanates used.

The viscosity of the at least one polyisocyanate (ii) is preferably less than 80 mPa·s, particularly preferably from 30 to 60 mPa·s (DIN ISO 2555, Brookfield RVT, spindle No. 3, 25° C.; 50 rpm).

The thermoplastic polyurethane matrix resin composition contains in preferred embodiments the polyisocyanate from 1 to 80 wt.-%, based on the total weight of the thermoplastic polyurethane matrix resin composition. In more preferred embodiments polyisocyanate is contained from 20 to 75 wt.-% and in most preferred embodiments from 40 to 70 wt.-%. The average NCO functionality of the polyisocyanate is preferably at least 2, more preferably at least 2.05, even more preferably at least 2.1. In particular, it is preferred that the average NCO functionality of the isocyanate is in the range of from 2.0 to 2.3, more preferably from 2.05 to 2.2, even more preferably from 2.1 to 2.15. The amount of polyisocyanate used is also dependent on the desired NCO:OH molar ratio, as defined below.

In various embodiments, the polyisocyanate comprises 10 to 70 wt.-%, preferably 30-50 wt.-% polymeric MDI relative to the total weight of the polyisocyanates in the composition. The remainder is preferably monomeric MDI.

The thermoplastic polyurethane matrix resin composition according to the present invention further comprise an alkoxylated aromatic diol (iii). "Aromatic diol", as used herein, refers to a diol having as a central unit an aromatic core and two hydroxyl groups. The diol may also comprise two aromatic rings. The hydroxyl groups are preferably not phenolic groups, i.e. are not directly bonded to the aromatic ring.

The aromatic core structure may be a condensed aryl and/or heteroaryl structure and may comprise further substituents. Examples of such aromatic core structures include, but are not limited to substituted forms of benzene, naphthaline, anthracene, phenanthrene, imidazole, pyridine, pyrrol, pyrimidine, pyrazine, quinoline, phenazine. Examples of aromatic diols with multiple aromatic rings are diols on the basis of biphenyl, terphenyl, 2,2'-bipyridine, diphenyl methane, 1,1-diphenyl ethane or 2,2-diphenyl propane.

Particularly preferred are aromatic diols based on phenol and formaldehyde, acetaldehyde or acetone or mixtures thereof, more preferably bisphenol A, bisphenol F or bisphenol NF.

The alkoxylated aromatic diol is preferably ethoxylated, propoxylated or both. Such diols are preferably those of formula (II):

understood that upon alkoxylation a range of different molecules are produced. This is apparent in that the total degree of alkoxylation $(n+n'+m+m')$ may not be an even value and may also not be an integer.

In various embodiments, propoxylated aromatic diols of formula (II) are preferred compared to ethoxylated or mixed EO/PO diols, i.e. $n=n'=0$.

Preferred is an aromatic diol of formula (II) with $Rx=CH_2$ or $C(CH_3)_2$, more preferably $C(CH_3)_2$.

Most preferred are aromatic diols of formula (II) with $Rx=C(CH_3)_2$, $n=n'=0$ and a total degree of alkoxylation of between 2 and 16, preferably between 2.5 and 16, more preferably 3 to 12.

It may be advantageous, if the composition comprises mixtures of different diols of formula (II).

The aromatic diol according to (iii) is preferably used in amounts of 2 to 75 wt.-% relative to the total weight of the TPU resin composition. The amount of the aromatic diol of formula (II) relative to the total amount of polyols may range from 5 to 90 wt.-%, preferably 10 to 80 wt.-%.

According to certain embodiments, the molar ratio of the OH groups of the combined components (i) and (iii) to the NCO groups of said polyisocyanate (ii) is from 2:1 to 1:10, preferably from 2:1 to 1:5, most preferably from 2:1 to 1:2.

The polyurethane matrix resin composition according to the present invention preferably comprises from 0 to 10 wt.-% of at least one auxiliary substance based on the total weight of the two-component polyurethane matrix resin. The at least one auxiliary substance is preferably admixed wholly or partially with the components (i) and (iii). The auxiliary substances can be added in order to modify the properties of the composition, such as for example viscosity, wetting behavior, stability, reaction kinetics, avoidance of bubble formation, storage life or adhesion. Examples of auxiliary substances are leveling agents, wetting agents, catalysts, and desiccants.

As catalysts, the polyurethane matrix resin composition can comprise metal organic compounds based on iron, titanium, zirconium, aluminum, lead, tin, and preferably bismuth. In a preferred embodiment, the catalysts contain

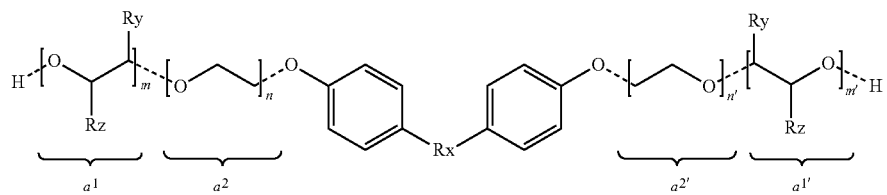

Herein Rx is selected from $CH_2$, $CH(CH_3)$ or $C(CH_3)_2$. Each n, n', m and m' are values such that $n+n'+m+m'=1$ to 20, preferably $n+n'+m+m'=1$ to 8.

Ry and Rz are selected such that Ry=H and Rz=methyl or vice versa.

Segments $a^1$ and $a^{1'}$ represent a propyleneoxide unit (PO) and $a^2$ and $a^{2'}$ an ethyleneoxide unit (EO). The dashed lines in Formula (II) schematically represent that the order of the bound alkylene oxide segments $a^1$, $a^{1'}$, $a^2$ and $a^{2'}$ is variable. Accordingly, it is understood that the units are arranged in blocks, alternating or randomly. The production of such alkoxylated aromatic diols can be done according to methods known in the art and to those skilled in the art.

It is further understood that when alkoxylating a diol molecules with different grades of alkoxylation in the two chains bound to the central unit can occur. It is further fatty acids or polyhydroxy compounds as chelating agents in a molar ratio of 0.25:1 to 2:1 to the metal atoms. Generally, substances suitable as chelating agents are in particular those, which comprise OH, COOH, or ester groups. During the crosslinking reaction, said chelating agents may accordingly also react with the polyurethane matrix resin composition and be firmly incorporated into the cured thermosetting polyurethane polymer matrix.

Another group of catalysts, which can be used in the polyurethane matrix resin composition are those based on tertiary amines. As an example, linear or preferably cyclic aliphatic amines can be employed, such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo-(5,4,0)-undecene-7 (DBU) or diazabicyclononene (DBN).

In a preferred embodiment, the catalyst is contained in a quantity of 0.01 to 5 wt-%, preferably up to 2 wt.-% based on the total weight of the polyurethane matrix resin composition.

According to certain embodiments, no pigments, molecular sieves and/or plasticizers are present in the polyurethane matrix resin composition. Furthermore, the polyurethane matrix resin composition preferably contains no organic solvents.

According to various embodiments, fillers, for example in the form of nanoparticles, may be added in order to modulate toughness and/or viscosity of the polyurethane matrix resin composition.

The TPU compositions of the present invention may be 2C PU compositions, wherein the first component comprises the polyols (i) and (iii) and all further polyols, if present, and the second component comprises the polyisocyanate (ii). Curing occurs then upon mixing both components, optionally in the presence of a catalyst, as described above, which may be added in the first or second component or separately. Optionally, a release agent may be used.

The present invention also relates to the thermoplastic polyurethane matrix resins obtainable by reacting the polyols (i) and (iii) with the polyisocyanates (ii). All embodiments disclosed above are similarly applicable to those resins.

In a preferred embodiment, the cured thermoplastic polyurethane matrix preferably has a glass transition temperature (Tg) of above 60° C. (measured by DSC, DIN 11357), more preferably more than 80° C., and a modulus of elasticity of more than 1000 MPa at temperatures of between −10° C. and +70° C. (in line with DIN EN ISO 527).

The present invention also relates to a composite, which comprises a cured thermoplastic polyurethane polymer matrix according to the present invention and a fiber material, wherein the cured thermoplastic polyurethane polymer matrix is used as a reinforcing binder. In preferred embodiments, the fiber material is contained in proportions of more than 30 vol.-%, based on the total volume of said fiber-reinforced composite. In more preferred embodiments, the fiber material is contained in 30 to 65 vol.-%, most preferred in 40 to 60 vol.-%, based on the total volume of said fiber-reinforced composite.

The fiber weight fraction can be experimentally determined, for example by the ignition loss method (ASTM D2854) or the matrix digestion method (ASTM D3171). The vol.-% of carbon fibers can preferably be measured according to DIN EN 2564:1998-08 in case of glass fibers preferably DIN EN ISO 1172:1998-12 can be employed. For unidirectional composites containing electrically conductive fibers (such as carbon) in a non-conductive matrix, the fiber volume fraction can be determined directly by comparing the electrical resistivity of the composite with that of fibers (ASTM D3355).

The fiber material contains preferably fibers selected from glass fibers, synthetic fibers, carbon fibers, boron fibers, ceramic fibers, metal fibers, natural fibers and combinations thereof, most preferably glass fibers, carbon fibers and combinations thereof. Specific examples of the respective category of fibers are disclosed in A. R. Bunsell, J. Renard "Fundamentals of Fibre Reinforced Composite Materials", CRC Press 2005, ISBN 0750306890. Examples for synthetic fibers include polyester fibers, polyethylene fibers, polypropylene fibers, polyamide fibers, like polyamide 6 or polyamide 6.6, polyimine fibers, poly (methyl methacrylate) and aramid fibers. Ceramic fibers include oxide and non-oxide ceramic fibers like aluminum oxide/silicon dioxide fibers, basalt fibers and carbon silicide fibers. Examples of metal fibers are steel, stainless steel or aluminum fibers. Examples of natural fibers are wood fibers, sisal fibers, flax fibers, hemp fibers, coconut fibers, banana fibers and jute fibers.

The fiber material can preferably be in the form of a mat, like a continuous fiber mat or a chopped strand mat, woven fabric, nonwoven fabric, non-crimped fabric, knitted fabric, plies, or roving.

In preferred embodiments, two or more of the forms of the fiber material can be employed. These forms can comprise one or more of the above described fibers, respectively.

The length of the fibers can be 0.1 to 1 mm, 1 to 50 mm or above 50 mm. In preferred embodiments the fiber length is above 50 mm, more preferably above 500 mm, most preferably the fiber is "endless", i.e. the fiber is a continuous fiber. Endless fibers or continuous fibers are employed in continuous fiber mats for the manufacture of endless fiber-reinforced composites, in particular endless fiber reinforced plastics. "Continuous" or "endless" means that the fibers reach from one end of the fiber mat to another, such that the fiber ends are located at the outer edges of the fiber mat and not inside the fiber mat. This improves the mechanical properties of the fiber-reinforced composites.

In a preferred embodiment, glass or carbon fibers having a length of above 500 mm are employed, more preferably these fibers are in the form of mats, nonwoven fabric and non-crimped fabric or combinations thereof.

The fiber-reinforced composite may further comprise a binder. Formulations of binders suitable for application in this context are well known in the art and may be selected from the group consisting of, as non-limiting examples thereof, thermosetting or thermoplastic binder compositions. The binder serves the purpose to ensure cohesion of the preform. Preferably, the binder is a thermoplastic polyurethane based binder in the form of a reaction product of at least one isocyanate, at least one polyol, such as a polyester and/or polyether-based polyol, and optionally one or more diol(s). The binder may further comprise additives, such as dyes, fillers (e.g., silicates, talcum, calcium carbonates, clays or carbon black), thixotropic agents (e.g., bentonites, pyrogenic silicic acids, urea derivatives, fibrillated or pulp short fibers), color pastes and/or pigments, conductivity additives (e.g., conductivity carbon blacks or lithium perchlorate), plasticizers, tackifiers, other thermoplastic polymers, stabilizers, adhesion promoters, rheological additives, waxes, etc. Optionally, a binder suitable for application in this context may further comprise fibers, which may be selected from the aforementioned fiber materials.

The present invention also provides a method for the manufacture of fiber-reinforced composites, comprising the steps:

1) providing an external mold comprising the fiber material;
2) introducing the polyurethane matrix resin composition into said mold, preferably under pressure; and
3) curing said composition at a temperature of up to 140° C., preferably from 60 to 120° C.

In step 1) of said method, a fiber material in combination with a suitable binder may be used.

The method for manufacture of fiber-reinforced composites comprises injection and infusion methods or combinations thereof. In particular, the method according to the invention comprises two embodiments. Inflow may be carried out rapidly by injection under pressure (Resin Transfer Molding or also RTM method), optionally also with vacuum assistance (VARTM). With the injection, pressure is built up, typically the pressure is increased up to 30 to 120 bar for high pressure-RTM and for low pressure-RTM up to 10 bar. The preferred polyurethane matrix resins employed in the RTM method have a short open time, but thereafter exhibit a rapid reaction. Preferably, the viscosity of the polyurethane matrix resin is low and may increase only slightly under the method conditions of mold filling. Care must be taken to ensure that the flow rate is selected such that air or gases can escape from between the fiber materials.

In case of the infusion method, a long open time is preferred, for which reason the polyurethane matrix resin should preferably contain no catalysts. Alternatively, retarded or temperature activated catalysts can be used. Inflow onto the fiber materials, displacement of air bubbles and mold filling may be carried out over an extended period. Due to the slow progress of the reaction, the fiber materials can be completely embedded in the matrix material.

In case of the RTM method, mold filling proceeds in a short time. The polyurethane matrix resin is introduced into the mold under pressure. The low initial viscosity ensures that the fibers are rapidly embedded. In this embodiment, the compositions preferably also contain catalysts. After a short time, the latter accelerate the reaction and curing therefore proceeds rapidly. This may also be assisted by an elevated temperature. A short residence time in the mold is then possible.

Since formation of macromolecules begins after mixing, it is convenient either for only the required quantities of the polyurethane matrix resin mixture to be produced and directly processed or, in another approach, the polyurethane matrix resin is produced continuously and introduced into the mold.

Once the mold has been filled, the polyurethane matrix resin begins to cure. Curing is preferably carried out under increased pressure, as achieved by the injection, as detailed above. This helps to prevent foaming. The curing may proceed without additional heat. The heat of reaction arising from the formation of macromolecules does not result in localized overheating of the substrates. The filled mold may be heated in order to accelerate the crosslinking reaction. It may be heated to temperatures of up to 140° C., preferably 60 to 120° C., so ensuring faster reaction rates. The molded part can thus be removed sooner from the mold and is then available for further working operations.

Acceleration of curing may be achieved by targeted temperature control of the method and not necessarily by the choice of the polyurethane matrix resin. Due the composition of the invention, a fiber-reinforced composite can be produced, which shows less defects, an improved mechanical strength, and allows for post-cure shape modification due to the thermoplastic properties of the cured polyurethane matrix resin.

The composition according to the present invention and the fiber-reinforced composite according to the present invention can be used in railway vehicles, automotive vehicles, aircraft vehicles, boats, space vehicles, motorbikes, bicycles, sporting goods, e.g., skis, snowboards, rackets, golf clubs, fishing rods, baseball bats, hockey sticks, arrows, archery bows, surfboards, and javelins, exercise equipment, cell phone and laptop housings, helmets, functional clothing, shoes, construction parts in bridges and buildings or wind turbine blades.

EXAMPLES

Example 1: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | 1,2-propane diol | 38.05 | 1.02 | 38.71 | |
| 2 | Ethoxylated bisphenol A | 200 | 0.234 | 46.78 | 280.5 |
| 3 | mixture of 4,4'-MDI and 2,4-MDI | 125.0 | 0.627 | 78.41 | |
| 4 | mixture of isomers of MDI and polymeric MDI with 11.6% polymer-MDI | 128.8 | 0.627 | 80.8 | |

Tg: 118° C.

Example 2: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A | 200 | 0.1 | 20.01 | 280.5 |
| 2 | 2,3-butane diol | 45.06 | 0.1 | 4.51 | |
| 3 | mixture of 4,4'-MDI and 2,4-MDI | 125.0 | 0.20 | 25.00 | |

Tg: 88° C.

Example 3: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A | 200 | 0.1 | 20.01 | 280.5 |
| 2 | 1,2-butane diol | 45.06 | 0.1 | 4.51 | |
| 3 | mixture of 4,4'-MDI and 2,4-MDI | 125.0 | 0.20 | 25.00 | |

Tg: 83° C.

Example 4: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A | 200 | 0.1 | 20.01 | 280.5 |
| 2 | 1,2-propane diol | 38.05 | 0.1 | 3.81 | |
| 3 | mixture of 4,4'-MDI and 2,4-MDI | 125.0 | 0.20 | 25.00 | |

Tg: 85° C.

Example 5: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A | 200 | 0.1 | 20.01 | 280.5 |
| 2 | 1,3-propane diol | 38.05 | 0.1 | 3.81 | |
| 3 | mixture of 4,4'-MDI and 2,4-MDI | 125.0 | 0.20 | 25.00 | |

Tg: 83° C.

Example 6: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A | 200 | 0.1 | 20.01 | 280.5 |
| 2 | 1,3-butane diol | 45.06 | 0.1 | 4.51 | |
| 3 | mixture of 4,4'-MDI and 2,4-MDI | 125.0 | 0.20 | 25.00 | |

Tg: 83° C.

Comparative Example 1: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A | 200 | 0.1 | 20.01 | 280.5 |
| 2 | 1,4-butane diol | 45.06 | 0.1 | 4.51 | |
| 3 | mixture of 4,4'-MDI and 2,4-MDI | 125.0 | 0.20 | 25.00 | |

Tg: 78° C.

Comparative Example 2: Thermoplastic Polyurethane Matrix Resin Composition

| No. | Raw material | Equivalent weight [g/eq] | Equivalent [eq] | Weighed portion [g] | OH number |
|---|---|---|---|---|---|
| 1 | Ethoxylated bisphenol A (Dianol 240) | 200 | 0.1 | 20.01 | 280.5 |
| 2 | mixture of 4,4'-MDI and 2,4-MDI | 125.0 | 0.1 | 12.50 | |

Tg: 70° C.

The invention claimed is:

1. A thermoplastic polyurethane matrix resin composition, comprising
   (i) at least one $C_{3-8}$ alkane diol of formula (I)

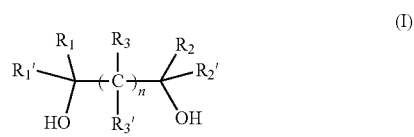

wherein
   $R_1$, $R_1'$, $R_2$, $R_2'$, $R_3$ and $R_3'$ are independently selected from H and substituted or unsubstituted $C_{1-4}$ alkyl,
   n is 0, 1, 2 or 3, and
   if n is 0, 2 or 3, at least one of $R_1$, $R_1'$, $R_2$ and $R_2'$ is substituted or unsubstituted $C_{1-4}$ alkyl;
   (ii) at least one polyisocyanate; and
   (iii) 5 to 75 wt. % of at least one alkoxylated aromatic diol relative to the total weight of the thermoplastic polyurethane resin composition;
   wherein the diols in the thermoplastic polyurethane matrix resin composition consist of the at least one $C_{3-8}$ alkane diol of formula (I) and the at least one alkoxylated aromatic diol.

2. The composition according to claim 1, wherein
   (a) n=0; or
   (b) $R_1'$ or $R_2'$ or both are H; or
   (c) $R_1$ and/or $R_2$ are selected from methyl and ethyl; or
   (d) any combination of (a), (b) and (c).

3. The composition according to claim 1, wherein the at least one $C_{3-8}$ alkane diol is a vicinal diol with n=0.

4. The composition according to claim 1, wherein the at least one $C_{3-8}$ alkane diol of formula (I) is selected from the group consisting of 2,3-butane diol, 2,3-pentane diol, 2,3-hexane diol, 3,4-hexane diol, 1,2-propane diol, 1,3-propane diol, 1,2-butane diol, 1,2-pentane diol, 1,2-hexane diol and combinations thereof.

5. The composition according to claim 1, wherein a molar ratio of the OH groups of the combined components (i) and (iii) to the NCO groups of said polyisocyanate (ii) is from 2:1 to 1:2.

6. The composition according to claim 1, wherein the at least one polyisocyanate is selected from the group consisting of 4,4'-diphenylmethanediisocyanate, 2,4'-diphenylmethanediisocyanate, polymeric 4,4'-diphenylmethanediisocyanate, polymeric 2,4'-diphenylmethanediisocyante and combinations thereof.

7. The composition according to claim 1, wherein the at least one polyisocyanate comprises 10 wt. % to 70 wt. % polymeric MDI based on the total weight of polyisocyanates in the composition.

8. The composition according to claim 1, wherein the at least one alkoxylated aromatic diol is a compound of formula (II)

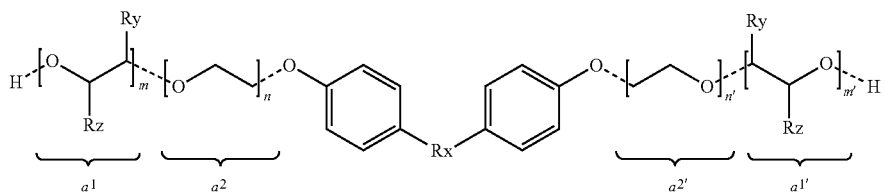

wherein Rx is selected from $CH_2$, $CH(CH_3)$ and $C(CH_3)_2$,
in the m block Ry is H and Rz is methyl or Ry is methyl and Rz is H,
in the m' block Ry is H and Rz is methyl or Ry is methyl and Rz is H, and
n, n', m and m' are values such that n+n'+m+m'=1 to 20.

9. The composition according to claim 8, wherein n+n'+m+m'=1 to 8.

10. The composition according to claim 1, wherein the thermoplastic polyurethane matrix resin composition further comprises at least one auxiliary substance.

11. The composition according to claim 1, being a two-component composition, wherein a first component comprises the at least one polyisocyanate and a second component comprises the at least one $C_{3-8}$ alkane diol and the at least one alkoxylated aromatic diol, the two parts being stored separately and mixed to initiate a curing reaction.

12. Cured reaction products of the composition according to claim 1.

13. A fiber-reinforced composite comprising:
cured reaction products of a thermoplastic polyurethane matrix resin composition, comprising
(i) at least one C3-8 alkane diol of formula (I)

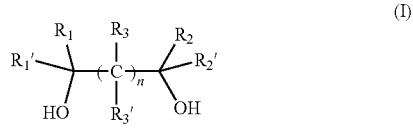

wherein
$R_1$, R1', R2¬, R2', R3 and R3' are independently selected from H and substituted or unsubstituted $C_{1-4}$ alkyl,
n is 0, 1, 2 or 3, and
if n is 0, 2 or 3, at least one of R1, R1', R2 and R2' is substituted or unsubstituted C1-4 alkyl;
(ii) at least one polyisocyanate; and
(iii) 5 to 75 wt. % of at least one alkoxylated aromatic diol relative to the total weight of the thermoplastic polyurethane resin composition, and
more than 30% by volume of a fiber material based on the total volume of the fiber-reinforced composite,
wherein the cured reaction products surround fibers of the fiber material.

14. A method for the manufacture of a fiber-reinforced composite, comprising:
providing an external mold comprising the fiber material;
providing a fiber material;
disposing the fiber material in the mold;
fluidly sealing the mold around the fiber material disposed therein;
providing a thermoplastic polyurethane matrix resin composition, comprising
(i) at least one C3-8 alkane diol of formula (I)

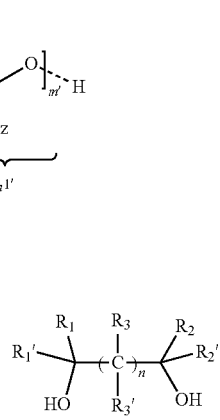

wherein
$R_1$, R1', R2¬, R2', R3 and R3' are independently selected from H and substituted or unsubstituted $C_{1-4}$ alkyl,
n is 0, 1, 2 or 3, and
if n is 0, 2 or 3, at least one of R1, R1', R2 and R2' is substituted or unsubstituted C1-4 alkyl:
(ii) at least one polyisocyanate; and
(iii) 5 to 75 wt. % of at least one alkoxylated aromatic diol relative to the total weight of the thermoplastic polyurethane resin composition
introducing the thermoplastic polyurethane matrix resin composition into the closed mold, wherein the thermoplastic polyurethane matrix resin composition surrounds fibers of the fiber material; and
curing the thermoplastic polyurethane matrix resin composition in the mold at a temperature above room temperature.

15. The method of claim 14 wherein the thermoplastic polyurethane matrix resin composition in the mold is cured at a temperature of up to 140° C.

16. The method of claim 14 wherein the thermoplastic polyurethane matrix resin composition in the mold is cured at a temperature from 60 to 120° C.

17. The method of claim 14 wherein the thermoplastic polyurethane matrix resin composition is introduced into the closed mold under pressure.

18. The method of claim 14 being resin transfer molding (RTM).

19. An article selected from a railway vehicle, an automotive vehicle, an aircraft vehicle, a boat, a space vehicle, a motorbike, a bicycle, a sporting good, an exercise equipment, a cell phone housing, a laptop housing, a helmet, a piece of clothing, a shoe, a construction part in a bridge, a construction part in a building or a wind turbine blade comprising a fiber material embedded in the cured reaction products of the composition according to claim 1.

* * * * *

UNITED STATES PATENT AND TRADEMARK OFFICE
CERTIFICATE OF CORRECTION

PATENT NO. : 11,312,810 B2
APPLICATION NO. : 16/429546
DATED : April 26, 2022
INVENTOR(S) : Andreas Niegemeier et al.

It is certified that error appears in the above-identified patent and that said Letters Patent is hereby corrected as shown below:

In the Specification

Column 4, Line 23 change "3,3'-dimethyldiphenyl-4,4'-diisocynate (TODD" to --3,3'-dimethyldiphenyl-4,4'-diisocynate (TODI)--.

Column 5, Line 37 change "bisphenol NF" to --bisphenol A/F--.

Signed and Sealed this
Twentieth Day of December, 2022

Katherine Kelly Vidal
*Director of the United States Patent and Trademark Office*